United States Patent [19]

Katayama et al.

[11] Patent Number: 5,996,930
[45] Date of Patent: Dec. 7, 1999

[54] LINE DISPENSER AND DISPENSING METHOD

[75] Inventors: Makoto Katayama; Kenji Kobayashi, both of Yokohama, Japan

[73] Assignee: Sumitomo Electric Industries, Ltd., Osaka, Japan

[21] Appl. No.: 08/816,380

[22] Filed: Mar. 13, 1997

[30] Foreign Application Priority Data

Mar. 13, 1996 [JP] Japan .................................. 8-056444

[51] Int. Cl.$^6$ .................................................. B65H 49/00
[52] U.S. Cl. .......................................... 242/593; 242/128
[58] Field of Search .................................. 242/128, 129, 242/593

[56] References Cited

U.S. PATENT DOCUMENTS

| | | |
|---|---|---|
| 3,093,333 | 6/1963 | Bishop . |
| 3,336,892 | 8/1967 | Barry et al. . |
| 3,351,158 | 11/1967 | Kite . |
| 3,372,665 | 3/1968 | Mesler . |
| 3,389,875 | 6/1968 | Brown . |
| 3,425,647 | 2/1969 | Kovaleski et al. ........................ 242/128 |
| 3,863,861 | 2/1975 | Bellasio .................................... 242/593 |
| 3,995,758 | 12/1976 | Kovaleski ................................. 242/593 |
| 3,997,127 | 12/1976 | Kovaleski ................................. 242/128 |
| 4,017,037 | 4/1977 | Kovaleski ................................. 242/128 |
| 4,055,314 | 10/1977 | Kovaleski ................................. 242/128 |
| 4,062,505 | 12/1977 | Kovaleski ................................. 242/128 |
| 4,135,679 | 1/1979 | Murphy et al. ........................... 242/128 |
| 4,322,047 | 3/1982 | Bonnabaud ............................... 242/128 |
| 4,487,153 | 12/1984 | McMahon et al. ....................... 242/128 |
| 4,508,290 | 4/1985 | Bauer ........................................ 242/128 |
| 4,553,707 | 11/1985 | Henrich .................................... 242/128 |
| 4,967,980 | 11/1990 | Pinson ...................................... 244/312 |
| 4,991,793 | 2/1991 | Belsley et al. ............................ 242/128 |
| 5,022,602 | 6/1991 | LoStracco ................................. 242/128 |
| 5,022,603 | 6/1991 | Maree et al. ............................. 242/128 |
| 5,028,013 | 7/1991 | Anseel ...................................... 242/128 |
| 5,052,636 | 10/1991 | Chesler .................................... 242/128 |
| 5,100,077 | 3/1992 | Gagne et al. ............................. 242/593 |
| 5,104,057 | 4/1992 | Chesler et al. ........................... 242/128 |

FOREIGN PATENT DOCUMENTS

| | | | |
|---|---|---|---|
| 216711 | 5/1957 | Australia ................................ 242/128 |
| 883662 | 10/1971 | Canada ................................... 242/128 |
| 1.115.161 | 4/1956 | France .................................... 242/128 |
| 1.158.910 | 6/1958 | France .................................... 242/128 |
| 1 258 696 | 1/1968 | Germany ................................ 242/128 |
| 59-143866 | 8/1984 | Japan ...................................... 242/593 |
| 59-149268 | 8/1984 | Japan ...................................... 242/593 |
| 2-291504 | 12/1990 | Japan . |
| 4-109966 | 9/1992 | Japan . |
| 5-51170 | 3/1993 | Japan ...................................... 242/593 |
| 6-12400 | 3/1994 | Japan . |
| 6-179575 | 6/1994 | Japan ...................................... 242/593 |
| 6-93047 | 11/1994 | Japan . |
| 1127144 | 9/1968 | United Kingdom ................... 242/128 |
| 2 044 717 | 10/1980 | United Kingdom ................... 242/593 |

OTHER PUBLICATIONS

Cable Systems for Command+Control, 1988, Published in England.

*Primary Examiner*—John P. Darling
*Attorney, Agent, or Firm*—Pillsbury Madison & Sutro LLP

[57] ABSTRACT

To dispense optical fiber, electrical wire, or the like between two desired points, a line dispenser and dispensing method for dispensing a line preliminarily housed inside to the outside of the line dispenser is provided. Particularly, the line dispenser is characterized by provision of a guide member, which is provided between a body portion of a reel and an aperture for dispensing the line to the outside of the line dispenser and which is rotatable about the center axis of the reel. This rotatable guide member enables smooth dispensing of the line.

20 Claims, 6 Drawing Sheets

LINE DISPENSER AND DISPENSING METHOD

BACKGROUND OF THE INVENTION

1. Field of the Invention

The present invention relates to a line dispenser and dispensing method used for line installation of optical fiber, electric wire, or the like between two desired points.

2. Related Background Art

For installing a fiber-optic cord (line) on the ground or in the sea including the sea bottom, the fiber-optic cord is normally drawn out of a line dispenser (enclosing the fiber-optic cord) fixed on a running body such as a car, a rocket, or a ship. There are various types of conventional line dispensers, for example, typified by those disclosed in Japanese Utility Model Publication No. 6-12400 and Japanese Patent Publication No. 6-93047. The dispensers described in these bulletins employ a tapered reel with the fiber-optic cord wound thereon and this reel is so constructed that the outer diameter of the tip portion thereof (small-diameter edge) is smaller than the outer diameter of an edge (large-diameter edge) facing the small-diameter edge. The fiber-optic cord wound on the reel is arranged to be drawn out along the axial direction from the large-diameter edge of the reel toward the small-diameter edge.

SUMMARY OF THE INVENTION

The inventors found the following problems as a result of having investigated each of the prior art described above. Namely, in the conventional line dispensers described above, the reel does not have any flange (an edge extending perpendicularly to the side surface of the reel on which the line is wound) and the reel has the tapered configuration (having gradually decreasing diameters along the line dispensing direction), which permits the line to be unwound easily from the reel upon dispensing of line. On the other hand, the coiled line (hereinafter referred to as "line coil") wound on the reel is easy to collapse.

A conceivable method for overcoming this problem is one for winding the line firmly on the reel and fixing the whole line coil with a semisolid material such as grease. However, the winding method is a special method (requiring a special winding technique) and needs some labor and time for coating of grease.

It is also conceivable to employ a method for using the ordinary structure of the reel provided with flanges at the both ends thereof. In this case the line unwound from the reel, however, directly touches the flange, which could cause disconnection or a trouble in dispensing of line. Therefore, this method has not been used heretofore.

It is, therefore, an object of the present invention to provide a line dispenser and dispensing method that can surely dispense the line of optical fiber, electrical wire, or the like housed inside and that is easy to handle.

Figure 1:
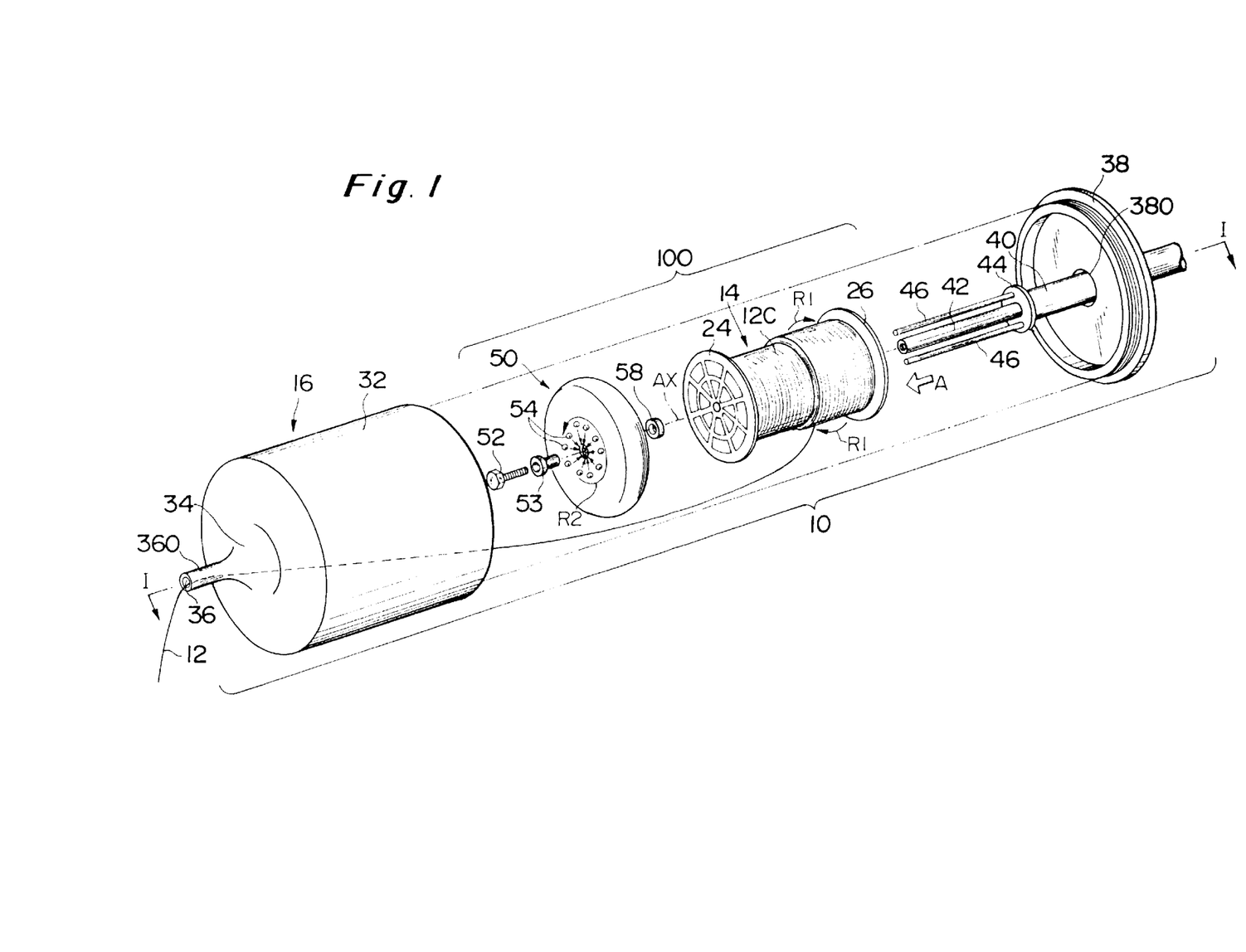
FIG. 1 is a drawing for explaining assembling steps of the first embodiment of the line dispenser according to the present invention.

The line dispenser according to the present invention is an apparatus for installing a line such as an optical fiber or an electric wire between desired first point and second point and has a special structure for smoothly dispensing the line housed inside to the outside of the apparatus. In particular, the line dispenser 10, for example as shown in FIG. 1, comprises at least a reel 14 having a first edge and a second edge facing the first edge and having the center axis AX extending from the first edge to the second edge, and a guide member 50 rotatably attached to the second edge of the reel 14 and arranged to rotate about the center axis AX.

The line 12 is wound around the center axis AX on the side surface (the peripheral surface of body portion 18) of the reel 14 located between the first edge and the second edge and is housed in that state inside the apparatus 10. The reel 14 is provided with first edge portion 26 and second edge portion 24 extending perpendicularly to the side surface at the first and second edges thereof, respectively. These first and second edge portions 26, 24 function to prevent collapse of winding of line coil 12C wound on the side surface of reel 14.

Further, the line dispenser 10 according to the present invention comprises a guide structure having an aperture 36 for dispensing the line 12 wound on the side surface of reel 14 to the outside of the apparatus 10 along the center axis AX of the reel 14 (from the first edge 26 toward the second edge). This aperture 36 is provided at a position facing the reel 14 through the guide member 50.

Figure 2:
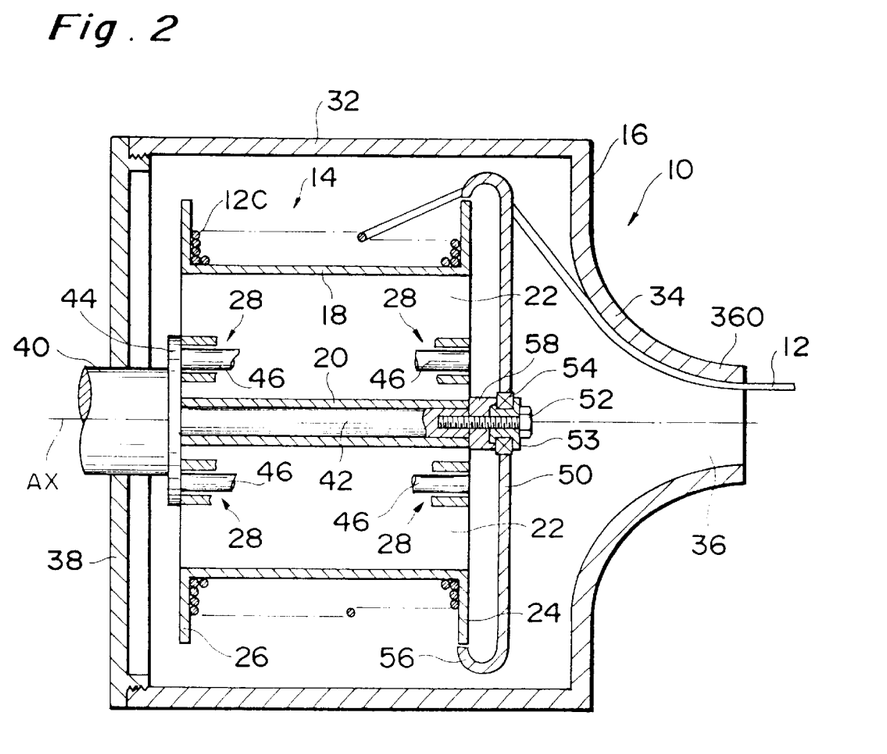
FIG. 2 is a drawing to show the cross-sectional structure of the first embodiment of the line dispenser according to the present invention, which is a cross-sectional view taken along line I—I in FIG. 1.

The guide member 50 includes a guide portion 56 having a curved surface for the line 12 to contact in order to enable smooth dispensing of line 12 (see FIG. 2). Accordingly, the apparatus 10 has the structure in which the guide portion 56 of guide member 50 prevents the line 12 drawn to the outside of apparatus from directly contacting each edge portion 24, 26 of reel 14.

Rotational force is exerted on this guide member 50 because of friction between the drawn line 12 and the guide portion 56 against which the line 12 is urged, whereby the guide member 50 starts rotating about the center axis AX of reel 14. On the other hand, the guide member 50 continues to rotate with rotation of reel 14 while the line 12 is drawn out of the apparatus 10 (the line 12 is urged against the guide portion 56 of guide member 50). Therefore, the guide member 50 thus rotating functions to unwind the line 12 wound on the side surface of reel 14.

As described, the line dispenser 10 according to the present invention is provided with the rotatable guide member 50 between the aperture 36 and the body portion 18 of the reel 14 with the line 12 wound thereon, thereby enabling smooth dispensing of the line 12 to the outside of the apparatus 10.

Figure 7:
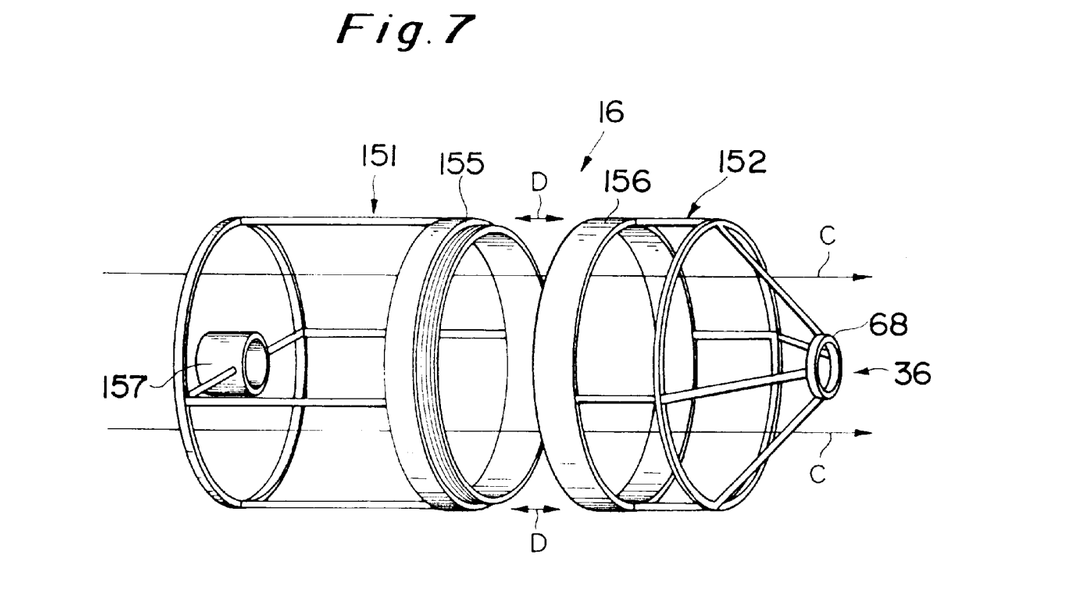
FIG. 7 is a perspective view to show the whole case, applied to the third embodiment of the line dispenser according to the present invention.

The line dispenser 10 according to the present invention preferably comprises a case 16 for housing at least the reel 14 with the line 12 wound thereon and the guide member 50 rotatably mounted to the reel 14 (see FIGS. 1, 2, and 7). Particularly, this case 16 comprises a barrel portion 32 for housing the above reel 14 and guide member 50, an aperture portion 360 including the aperture 36 for letting the line 12 out of the apparatus 10, and a taper portion 34 for connecting the barrel portion 32 to the aperture portion 360. The aperture portion 360 is included in the guide structure, and the taper portion 34 is provided in a portion directly contacting the line 12 among the inner walls of the case 16 and this taper portion 34 enables smooth dispensing of line 12.

Figure 5:
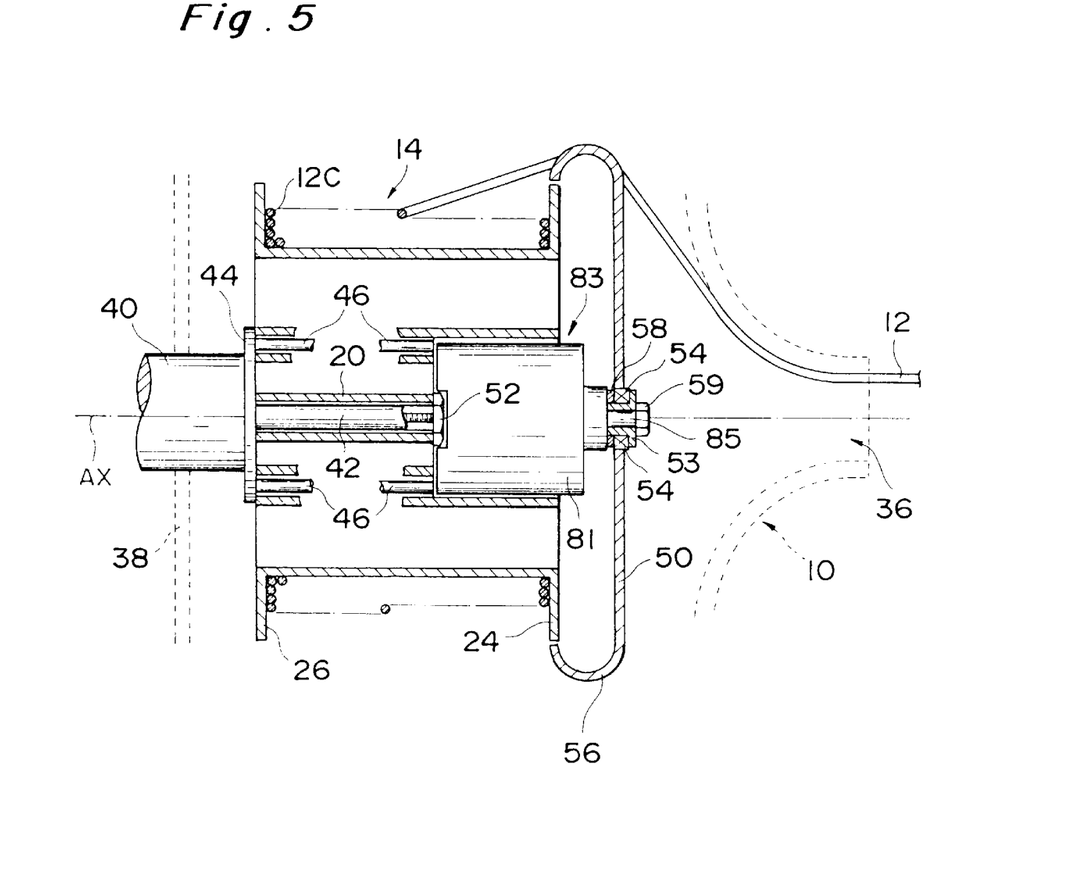
FIG. 5 is a drawing to show the cross-sectional structure of the second embodiment of the line dispenser according to the present invention, which is a view comparable to the cross-sectional view taken along line I—I in FIG. 1.

Further, the line dispenser 10 according to the present invention may comprise a driving mechanism for positively rotating the guide member 10 in a direction (a direction indicated by the arrow R2 in FIG. 1) opposite to the winding direction (the direction indicated by the arrow R1 in FIG. 1) of the line 12 onto the reel 14. Particularly, as shown in FIG. 5, a driving motor 81 is set in a depression 83 provided in the reel 14 and the guide member 50 is attached to a rotary shaft 85 of the driving motor 81, whereby the guide member 50 can be rotated about the center axis AX of reel 14.

Figure 6:
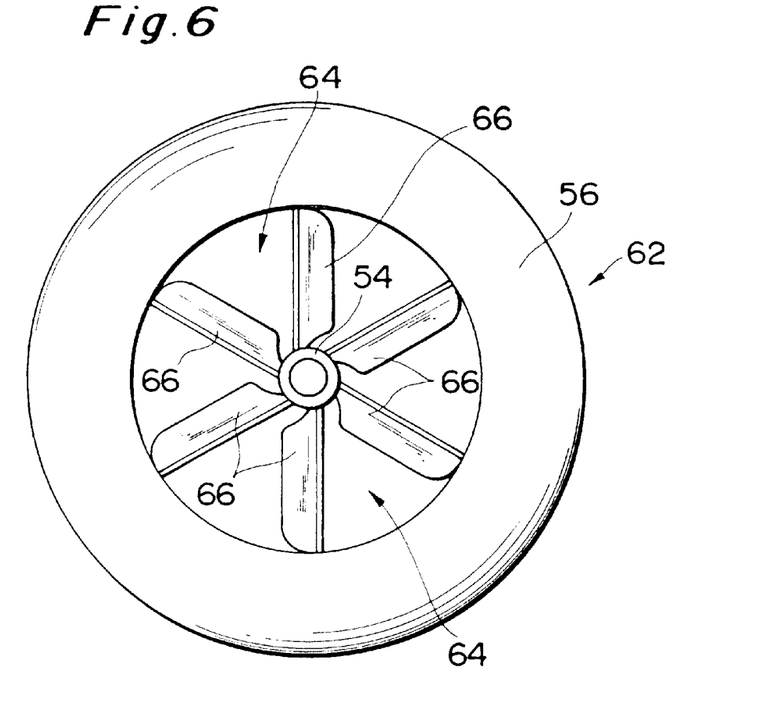
FIG. 6 is a plan view to show the structure of the guide member, applied to the third embodiment of the line dispenser according to the present invention.

The line dispenser 10 according to the present invention can operate while being attached to a running body that can move in water. For applications under such operation conditions, the guide member 50 is preferably provided with blades 66 extending from the center area of the guide member to the peripheral area of the guide member as shown in FIG. 6, as well as the above-stated configuration. The blades 66 convert force from fluid moving in the direction indicated by the arrows C in FIG. 8 to rotational force of the guide member 50. A preferable structure of the case 16 suitable for such circumstances is one constructed of pipes or the like so as to allow the fluid to flow into the inside of case 16, for example, as shown in FIG. 7.

Figure 9:
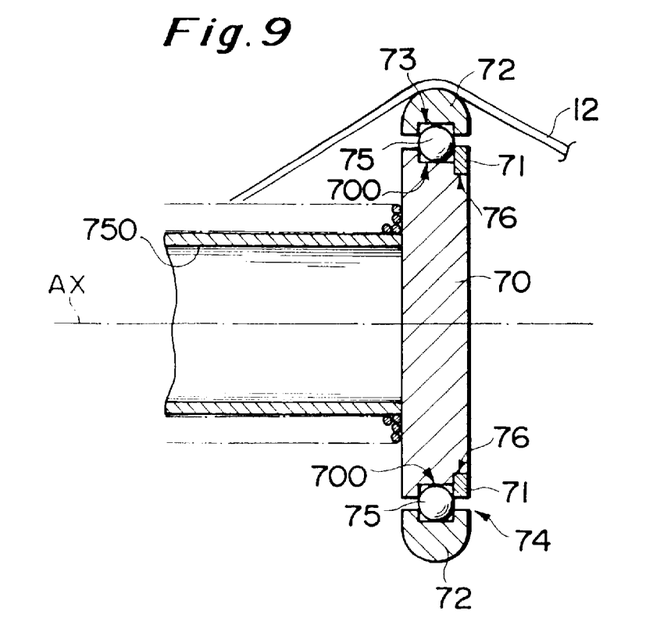
FIG. 9 is a drawing to show the cross-sectional structure of the guide member, applied to the fourth embodiment of the line dispenser according to the present invention.

The guide member 50 rotating about the center axis AX of reel 14 may be rotatably mounted on the peripheral part of the second edge portion 24 (included in a support member) provided at the second edge of reel 14, as shown in FIG. 9.

Figure 4:
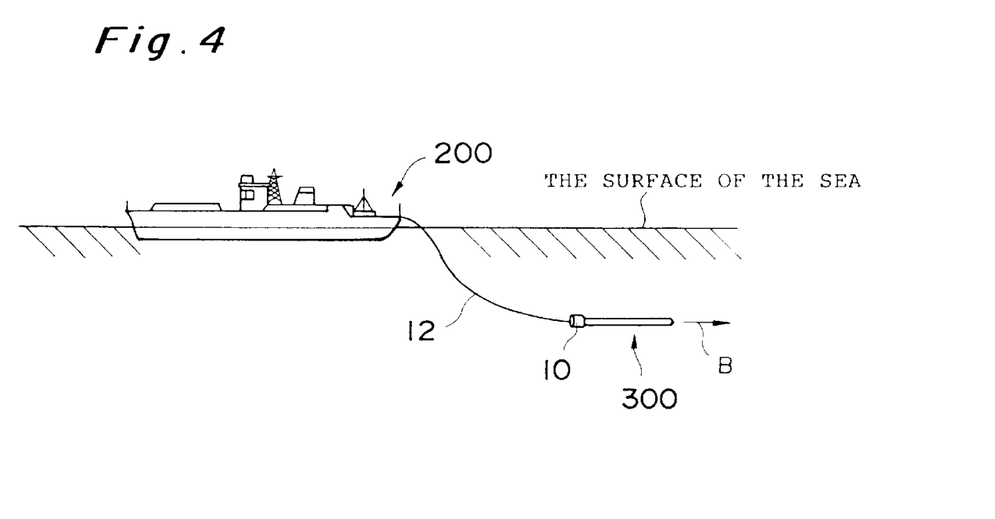
FIG. 4 is a drawing for explaining an embodiment of the line dispensing method according to the present invention.

For installing the line 12 between desired first and second points (by the line dispensing method according to the present invention), for example as shown in FIG. 4, the line dispenser 10 according to the present invention, so constructed, is mounted on a running body 300, for example, a submarine, an underwater rocket, or the like moving in the sea, and one end of the line 12 housed in the apparatus 10 is fixed to a mother ship 200 (the first point). Then the running body 300 runs from the mother ship 200 (the first point) to the second point, whereby the line 12 housed in the line dispenser 10 is dispensed to the outside of the apparatus 10 with movement of the running body 300.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Each of the embodiments of the line dispenser according to the present invention will be described with reference to FIG. 1 to FIG. 10.

FIG. 1 is a drawing for explaining the assembling steps of the first embodiment of the line dispenser 10 according to the present invention. It is noted that the assembling steps in the other embodiments are basically the same except for the structure of each constituent member.

In the line dispenser 10 according to the present invention, the reel 14 on which the line such as the optical fiber or the electric wire is wound is housed in a space defined by case 16 and stem 38. This case 16 comprises the barrel portion 32 for surrounding the reel 14, the taper portion 34 continuous from the barrel portion 32, and the aperture portion 360 (included in a guide structure) continuous from the taper portion 34, including the aperture 36. Provided in the central area of stem 38 is a through hole 380 for a support shaft 40 for supporting the reel 14 at a predetermined position in the case 16 to pass therethrough.

A flange 44 is provided at the fore end of the support shaft 40 and this flange 44 is provided with a shaft pin 42 for defining the center axis AX of the reel 14 and with fixing pins 46, disposed on either side of the shaft pin 42, for preventing the reel 14 from rotating about the shaft pin 42. These pins 42, 46 each have a configuration extending in the direction (the direction along the center axis of reel 14) of insertion of the support shaft 40.

The reel 14 on which the line 12 is wound (reference symbol 12C is a line coil in the drawing) is provided with the first edge portion 26 and second edge portion 24 each extending perpendicularly to the side surface of the body portion 18 of the reel 14, at the both edges thereof. The line 12 wound on the reel 14 is dispensed to the outside of the apparatus 10 from the first edge portion 26 toward the second edge portion 24.

Further, the guide member 50 is attached to the second edge portion 24 of the stationary reel 14 by bolt 52 through ring members 53, 58. A through hole for housing bearing balls 54 is provided in the central area of this guide member 50 and these ball bearings or bearing balls 54 support the guide member 50 on the reel 14 in a rotatable state in the direction indicated by the arrow R2 in the drawing.

In this structure, the reel 14 is preferably stationary, and thereby the guide member 50 can be rotatable with respect to the reel 14. However, when the reel 14 is rotatable about the center axis of the reel 14, it is necessary to provide a rotary joint (rotary connector) at the first edge side of the reel 14 for the line 12 wound around the body portion 18 of the reel 14.

In the line dispenser 10 according to the present invention, the above reel 14 and rotatable guide member 50 constitute a reel part 100 housed in a winding state of line 12 in the case 16.

Figure 3:
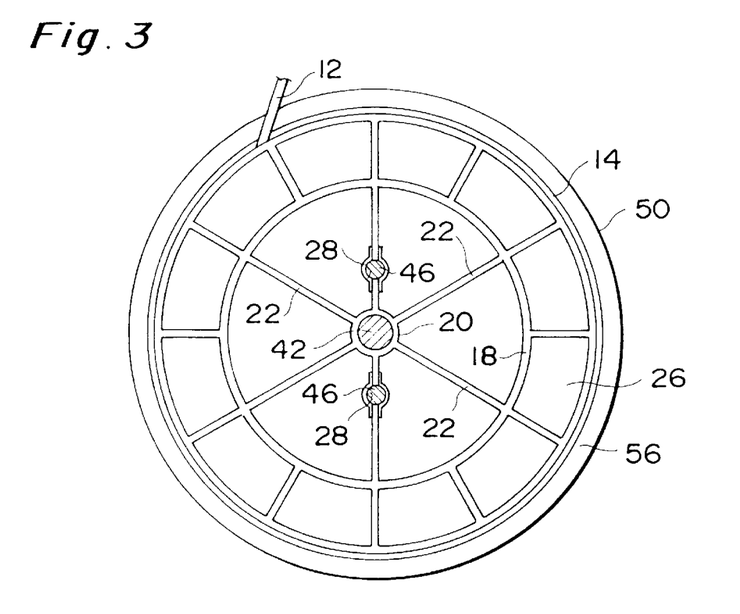
FIG. 3 is a plan view of the reel part, observed along the direction indicated by the arrow A in FIG. 1.

FIG. 2 is a drawing to show the structure of the first embodiment of the line dispenser 10 according to the present invention, which is a cross-sectional view taken along line I—I of FIG. 1. FIG. 3 is a plan view of the reel part 100, observed along the direction indicated by the arrow A in FIG. 1. The line dispenser 10 as illustrated is for dispensing the fiber-optic cord as a line, this fiber-optic cord 12 is wound around the body portion 18 of the reel 14, and they are housed in the case 16.

The reel 14 has the cylindrical body portion 18 around which the fiber-optic cord 12 is wound. Inside the body portion 18, a shaft portion 20 for receiving the shaft pin 42 is positioned along the center axis AX. The shaft portion 20 and body portion 18 are connected to each other by a plurality of plates 22. Further, the first edge portion 26 and second edge portion 24 are provided at the both edges of the body portion 18. These first and second edge portions 26, 24 both are formed in a disk shape integral with the body portion 18.

On the other hand, the case 16 comprises the cylindrical barrel portion 32 for housing the reel 14, the taper portion 34, and the aperture portion 360 (included in the guide structure). The aperture portion 360 is included in a guide structure for defining a predetermined space through which the fiber-optic cord 12 passes, and the aperture 36 for dispensing the fiber-optic cord 12 to the outside of apparatus is provided at the tip of the aperture portion 360. The opposite end to the aperture portion 360 is closed by a cover plate (stem) 38. The support shaft 40 for supporting the reel 14 is fixed in and through the center portion of the cover plate 38 and extends along the center axis of the case 16 (coincident with the center axis AX of reel 14). The reel 14 is detachably supported by inserting the shaft pin 42 extending from the support shaft 40 into the shaft portion 20. If rotation stop holes 28 are formed in the plates 22 of reel 14 as illustrated, a preferable arrangement will be such that fixing pins 46 are provided on the flange 44 of support shaft 40 and the fixing pins 46 are inserted into the rotation stop holes 28, thereby preventing the reel 14 from rotating. This embodiment is so constructed that the stem 38 can be removed from the barrel portion 32 of the case 16, for attachment or detachment of the reel 14.

The line dispenser 10 further has a rotary disk (guide member) 50. The guide member 50 is rotatably mounted through ring members 53, 58 by the bolt 52 coupling with one end of the shaft pin 42 provided at the tip of the support shaft 40. Bearing balls 54 are housed in a space defined by a through hole of the guide member 50 and the ring members 53, 58. The outer diameter of the guide member 50 is larger than that of the second edge portion 24 and the peripheral portion thereof is curved toward the second edge portion 24. The cross-sectional shape of this curved portion (guide portion) 56 is preferably a generally semicircular shape and the outer surface thereof is preferably as smooth as possible. As seen also from FIG. 2, the bolt 52 supporting the guide member 50 also functions as a stop for preventing slip-out of the reel 14, and, for removing the reel 14 from the support shaft 40, the bolt 52 is taken away from the support shaft 40.

In the line dispenser 10 so constructed, the first and second edge portions 26, 24 are provided at the both edges of the reel 14 and the body portion 18 thereof is cylindrical, which permits the fiber-optic cord 12 to be wound easily around the body portion 18 of reel 14 with an ordinary cord winding apparatus. Since the fiber-optic cord (line coil) 12C once wound is supported at the both sides thereof by the first and second edge portions 26, 24, collapse of winding hardly occurs and handling and storage becomes easier.

The reel 14 with the fiber-optic cord 12 wound thereon is mounted on the support shaft 40 as described above and thereafter is fixed by screwing the bolt 52 through the center hole defined by the spacer (ring member) 58 and bearing balls 54 into the end of the support shaft 40. At this time the reel 14 and case 16 are positioned coaxially, so that the aperture portion 360 of the case 16 faces the center of the guide member 50. Then the dispensing end of the fiber-optic cord 12 is drawn via the periphery of the guide portion 56 of the rotatable guide member 50 and through the aperture 36 of the aperture portion 360 of the case 16 to the outside of case 16.

For example, when the fiber-optic cord 12 is installed on the sea bottom as shown in FIG. 4, the line dispenser 10 is usually attached to the underwater rocket 300 being a running body and the end of the fiber-optic cord 12 is fixed to the mother ship 200 (the first point). Then the underwater rocket 300 is launched from the mother ship 200 toward the second point, and then the underwater rocket 300 advances in the direction indicated by the arrow B in the drawing. The fiber-optic cord 12 is unwound from the cord coil 12C on the reel 14 by tension exerted by this underwater rocket 300.

At this time, the tension acts along the direction of the center axis AX of the reel 14 on the fiber-optic cord 12, while rotational force occurring upon unwinding from the cord coil 12C, which is force perpendicular (lateral) to the direction of the center axis AX of reel 14, also acts on the fiber-optic cord 12. If the guide member 50 were fixed, this lateral force would cause friction more than necessary between the fiber-optic cord 12 and the rotatable guide portion 56, which could cause a trouble in dispensing of the fiber-optic cord 12. However, the guide member 50 is arranged to be rotatable. Therefore, even if slightly large friction is built up between the fiber-optic cord 12 and the guide portion 56 to which the fiber-optic cord 12 contacts directly, the guide portion 56 will rotate with dispensing of the fiber-optic cord 12, thereby preventing the friction from becoming too large. This enables the fiber-optic cord 12 to be dispensed smoothly, and thus, installation thereof can be performed satisfactorily.

Although the first embodiment of the present invention is so constructed that the guide member 50, i.e., the guide portion 56 directly contacting the fiber-optic cord 12, is rotatable, an appropriate driving mechanism may be provided to positively rotate the guide portion 56 in response to dispensing of the fiber-optic cord 12 (as in the second embodiment). Such a driving mechanism can be realized by incorporating an electric motor 81 in the reel 14 as shown in FIG. 5 and attaching the guide member 50 to a rotational shaft 85 thereof. In that case, the rotation direction of the guide member 50 by the driving mechanism is opposite to the cord winding direction (see the arrows R1, R2 in FIG. 1).

FIG. 5 is a drawing to show the structure of the second embodiment of the line dispenser according to the present invention, which is a view corresponding to the cross-sectional view taken along line I—I in FIG. 1.

This second embodiment is provided with a depression 83 for receiving the motor 81 on the second edge portion side of the reel 14. The guide member 50 is supported through the bearing balls 54 by a fixing member 59 at the tip of rotation shaft 85 of the motor 81 fixed in the depression 83. The other structure is the same as the configuration of the first embodiment (FIG. 2) described previously.

Figure 8:
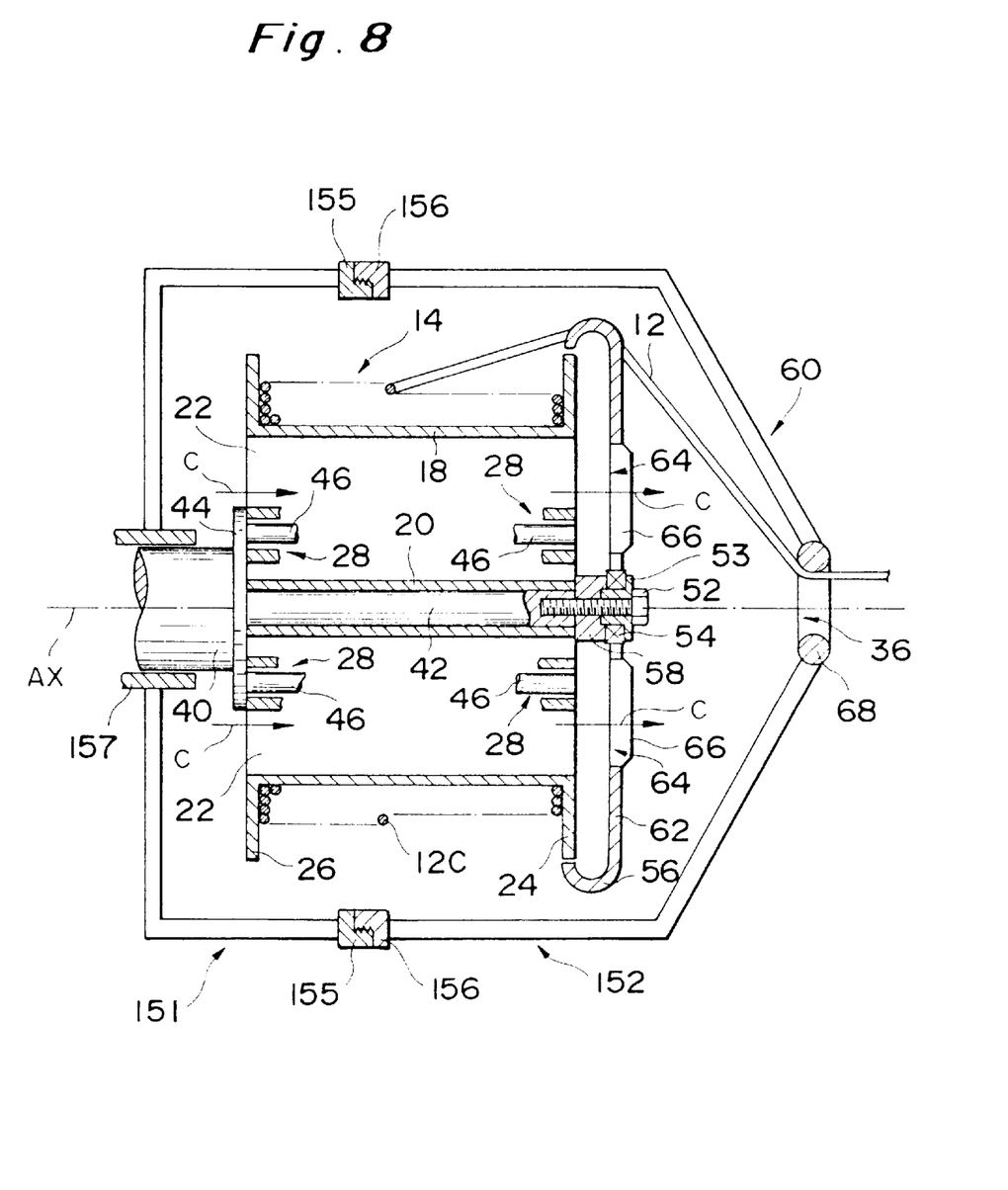
FIG. 8 is a drawing to show the cross-sectional structure of the third embodiment of the line dispenser according to the present invention, which is a view comparable to the cross-sectional view taken along line I—I in FIG. 1.

The third embodiment of the line dispenser according to the present invention is next described using FIG. 6 to FIG. 8.

These FIG. 6 to FIG. 8 are drawings to show the structure of the third embodiment of the line dispenser according to the present invention. This line dispenser 60 of the third embodiment has through holes 64 formed in the central region of the guide member 50 and a plurality of blades 66 extend from the center of the guide member 62 toward the periphery (see FIG. 6). Further, the third embodiment is different from the first embodiment (FIG. 2) in that a ring 68 including a ring aperture 36 for dispensing the cord faces the reel 14 through the guide member 62. The ring 68 is included in the guide structure. Since the other elements are substantially the same as those in the first embodiment (FIG. 2), they are denoted by the same reference numerals and detailed description thereof is omitted herein. Particularly, the case 16 of the third embodiment comprises a first framework 151 and a second framework 152 made of pipes. The first framework 151 has a guide 157 for holding the support shaft 40, and a connecting portion 155 for connection with the second framework 152. On the other hand, the second framework 152 has the above ring 68, and a connecting portion 156 for connection with the first framework 151. The ring 68 is preferably rotatable about the center axis of the reel 14. Then these first and second frameworks 151, 152 are coupled with each other along the directions indicated by the arrows D in the drawing.

The line dispenser 60 (FIG. 8) of the third embodiment is constructed so as to utilize, as rotational driving force of the guide member 62, water flow (indicated by the arrows C in the drawing) occurring relative to the apparatus 60 when moving in water. When the blades 66 are subjected to the water flow in the direction of the arrows C of FIG. 8, they rotate the guide member 62 in the unwinding direction of the fiber-optic cord 12 from the line coil 12C. Accordingly, when the line dispenser 60 is moved in the direction opposite to the direction of the arrows C in water, the water passes through the space between the shaft portion 20 and the body portion 18 of reel 14 to hit the blades 66 so as to rotate the guide member 62, thereby enabling to help dispensing of the fiber-optic cord 12.

The blades 66 may be set on the outer periphery of the guide member 62, i.e., on the outer periphery of the rotatable guide portion 56. However, in that case, since the fiber-optic cord 12 cannot be drawn via the outside of the guide portion 56, it is necessary to form a through hole in the guide portion 56 and pass the fiber-optic cord through the hole.

The preferred embodiments of the present invention were described above, but it will be understood that the present invention is by no means limited to these embodiments. For example, each of the above embodiments has such an arrangement that the second edge portion 24 is provided separately from the guide member 50 (FIG. 2, FIG. 5) or 62 (FIG. 8), but, as shown in FIG. 9, the guide member 74 may be constructed in such structure that a rotatable guide portion 72 is provided on the peripheral portion of the second edge portion 70 (the fourth embodiment). The second edge portion 70 is included in a support member. The reel 14 shown in FIG. 9 is so constructed that the body portion 750 on which the fiber-optic cord 12 is wound also functions as a shaft portion.

Figure 10:
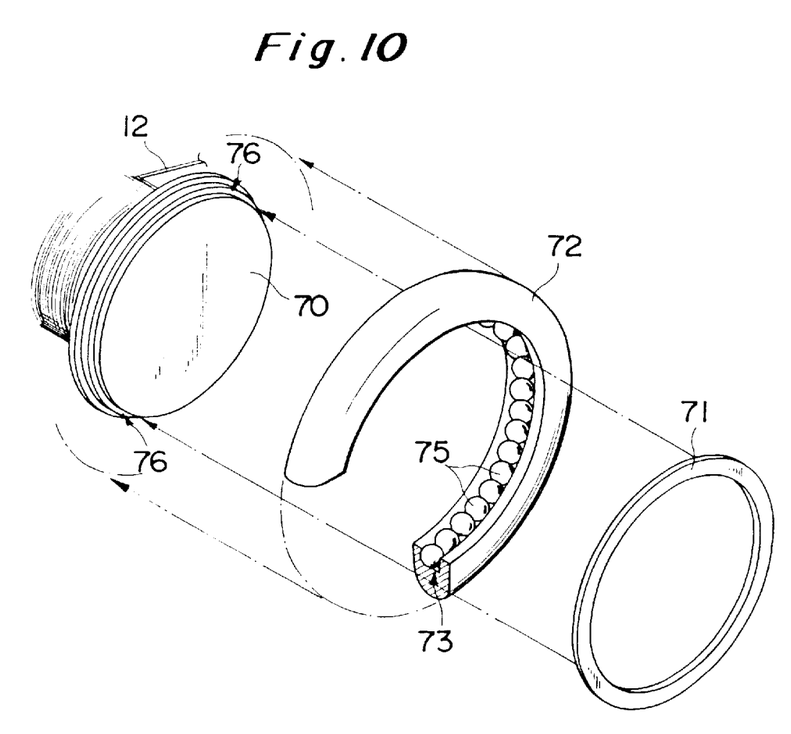
FIG. 10 is a drawing for explaining assembling steps of the guide member (the fourth embodiment) shown in FIG. 9.

Specifically, FIG. 9 is a drawing to show the structure of the fourth embodiment of the line dispenser according to the present invention, and FIG. 10 is a drawing for explaining the assembling steps of the guide member 74 shown in FIG. 9.

Namely, a step portion 76 for a ring member 71 to be attached thereto is provided on the periphery of the second edge portion 70 of reel 14. This second edge portion 70 and the ring member 71 form a groove 700 in which bearing balls 75 are placed. On the other hand, the ring guide member 74 has a groove 73 for the above bearing balls 75 to be set therein, inside the guide portion 72 having a curved surface with which the fiber-optic cord 12 directly contacts. The bearing balls 75 are set in the space defined by the groove 700 of the second edge portion 70 and the groove 73 of the guide portion 72. Further, in order to prevent the bearing balls 75 from jumping out through the gap between the grooves 700, 73, the ring member 71 closes this gap, thus constituting the fourth embodiment.

Each of the above embodiments was described with the fiber-optic cord as a line, but another line such as a copper wire can also be used.

As described above, since the line dispenser according to the present invention uses the reel with the edge portions provided at the both edges thereof, winding and storage of line, and the other handling becomes easier.

Since the guide member for keeping the unwound line away from the edge portion of reel is rotatably attached to the reel, the guide member can also rotate with circumferential motion of the line occurring upon unwinding of line, thereby enabling smooth dispensing of line. This is especially effective in using the fragile fiber-optic cord as a line to be dispensed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 8-056444 (056444/1996) filed on Mar. 13, 1996 is hereby incorporated by reference.

What is claimed is:

1. A dispensing method for installing a line in water between desired first and second points, said method comprising:

preparing a line dispenser for dispensing said line housed inside to the outside of said line dispenser, said line dispenser mounted on a running body capable of moving in water from a desired first point toward a desired second point, and comprising:

a reel having a first edge and a second edge facing said first edge and having a center axis extending from said first edge toward said second edge, said reel having a side surface located between said first edge and said second edge, said line being wound on said side surface so as to surround the center axis of said reel;

a guide structure provided at a position facing said second edge of said reel, said guide structure defining a predetermined space through which said line passes; and a guide member provided between said guide structure and said reel so as to be rotatable about the center axis of said reel and with respect to said reel, said guide member having a curved surface which surrounds the center axis of said reel and with which said line contacts when said line is drawn out of said line dispenser, whereby rotational force is exerted on said guide member by said drawn line;

mounting said line dispenser on a running body capable of moving in water from the first point toward the second point;

fixing at the first point one end of said line drawn out of said line dispenser; and moving said running body in water from the first point to the second point, thereby dispensing said line housed in said line dispenser to the outside of said line dispenser with movement of the running body.

2. A line dispenser for dispensing a line housed inside to the outside of said line dispenser, said line dispenser mounted on a running body capable of moving in water from a desired first point toward a desired second point, comprising:

a reel having a first edge and a second edge facing said first edge and having a center axis extending from said first edge toward said second edge, said reel having a side surface located between said first edge and said second edge, said line being wound on said side surface so as to surround the center axis of said reel;

a guide structure provided at a position facing said second edge of said reel, said guide structure defining a predetermined space through which said line passes; and a guide member provided between said guide structure and said reel so as to be rotatable about the center axis of said reel and with respect to said reel, said guide member having a curved surface which surrounds the center axis of said reel and with which said line contacts when said line is drawn out of said line dispenser, whereby rotational force is exerted on said guide member by the drawn line.

3. A line dispenser according to claim 1, wherein said guide structure includes an aperture for dispensing said line wound on the side surface of said reel.

4. A line dispenser according to claim 1, further comprising a case for housing at least said reel and said guide member, said case having said guide structure.

5. A line dispenser according to claim 1, further comprising a driving mechanism for rotating said guide member in a direction opposite to a winding direction of said line onto said reel.

6. A line dispenser according to claim 5, wherein said driving mechanism comprises a motor, said motor being disposed so that a rotational axis thereof is coincident with the center axis of said reel.

7. A line dispenser according to claim 5, wherein said driving mechanism comprises blades provided on said guide member, said blades extending from a central region of said guide member toward a peripheral region of said guide member.

8. A line dispenser according to claim 1, wherein said reel has first and second edge portions extending perpendicularly to said side surface at said first and second edges, respectively.

9. A line dispenser according to claim 1, further comprising a support member extending perpendicularly to the center axis of said reel, and wherein said guide member is attached rotatably on the periphery of said support member so as to surround the center axis of said reel.

10. A line dispenser according to claim 9, wherein said support member is positioned at said second edge of said reel, and wherein said guide member is attached rotatably on the periphery of said support member so as to surround the center axis of said reel.

11. A dispensing method for installing a line between first and second points, said method comprising:

providing a line dispenser including a reel having a center axis, spaced first and second edges and a body portion extending between said first edge and said second edge about said center axis, the line being wound on said body portion, a guide structure provided at a position spaced from said second edge of said reel, said guide structure defining a predetermined space through which the line passes, and a guide member provided between said guide structure and said body portion of said reel so as to be rotatable about the center axis of said reel and with respect to said reel, said guide member guides the line as it is dispensed and has a curved surface which surrounds the center axis of said reel and with which the line contacts when the line is drawn out of said line dispenser, whereby rotational force is exerted on said guide member by the drawn line;

mounting said line dispenser on a running body capable of moving from the first point toward the second point;

fixing one end of the line at the first point; and moving said running body from the first point to the second point, thereby dispensing the line housed in said line dispenser between the first and second points.

12. A line dispenser for dispensing a line, said line dispenser being mounted on a running body capable of moving a long a path from a first point to a second point, comprising:

a reel having a center axis, spaced first and second edges and a body portion extending between said first edge and said second edge about said center axis, the line being wound on said body portion;

a guide structure provided at a position spaced from said second edge of said reel, said guide structure defining a predetermined space through which the line passes; and a guide member provided between said guide structure and said body portion of said reel so as to be rotatable about the center axis of said reel and with respect to said reel, said guide member having a curved surface which surrounds the center axis of said reel and with which said line contacts when the line is drawn out of said line dispenser, whereby rotational force is exerted on said guide member by the drawn line.

13. A line dispenser according to claim 12, wherein said guide structure defines an aperture for dispensing therethrough the line wound on said body portion of said reel.

14. A line dispenser according to claim 12, further comprising a case for housing said reel and said guide member, said case including said guide structure.

15. A line dispenser according to claim 12, further comprising a driving mechanism for rotating said guide member in a direction opposite to a winding direction of said line onto said reel.

16. A line dispenser according to claim 15, wherein said driving mechanism comprises a motor, said motor being disposed so that a rotational axis thereof is coincident with the center axis of said reel.

17. A line dispenser according to claim 15, wherein said driving mechanism comprises blades provided on said guide member, said blades extending from a central region of said guide member toward a peripheral region of said guide member.

18. A line dispenser according to claim 12, wherein said reel has first and second edge portions extending perpendicularly to said body portion at said first and second edges, respectively.

19. A line dispenser according to claim 12, further comprising a support member extending perpendicularly to the center axis of said reel, and wherein said guide member is attached rotatably on the periphery of said support member so as to surround the center axis of said reel.

20. A line dispenser according to claim 19, wherein said support member is positioned at said second edge of said reel, and wherein said guide member is attached rotatably on the periphery of said support member about the center axis of said reel.

* * * * *